April 9, 1946. C. E. WYRICK 2,398,343
SWIVEL NOSE SCREW
Filed Aug. 5, 1944
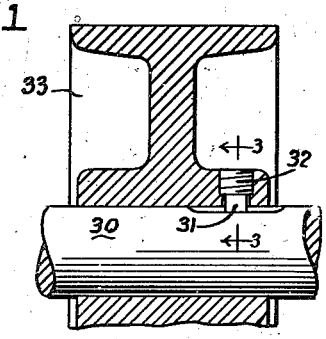
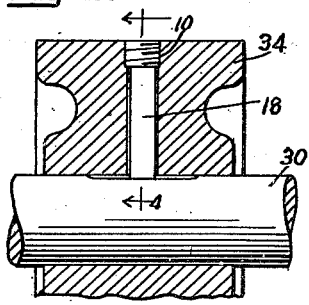
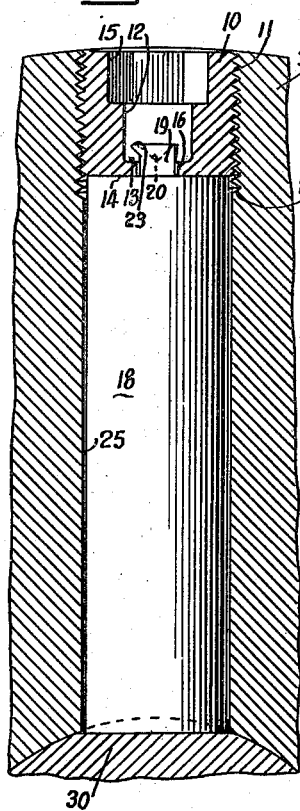
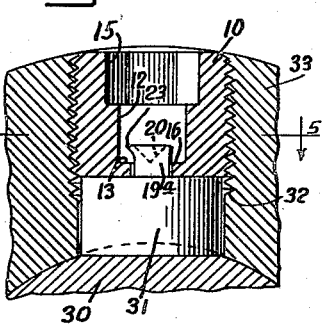
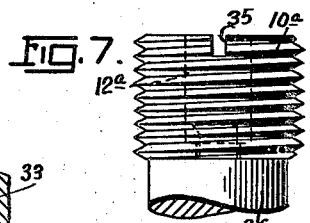
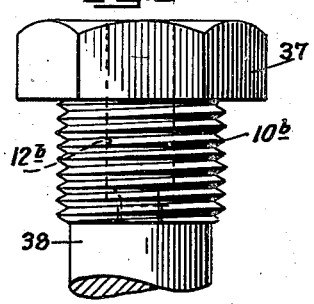
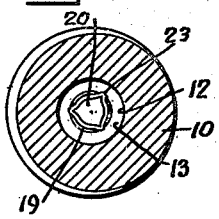
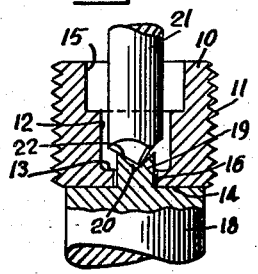
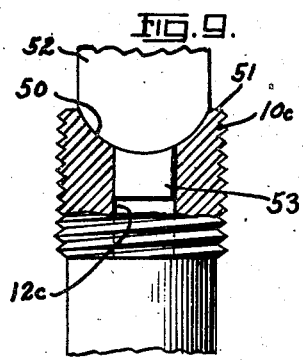
INVENTOR
CLAYTON E. WYRICK
BY
ATTORNEY Patented Apr. 9, 1946

2,398,343

UNITED STATES PATENT OFFICE 2,398,343

SWIVEL NOSE SCREW

Clayton E. Wyrick, Miami, Fla.

Application August 5, 1944, Serial No. 548,231

5 Claims. (Cl. 85—1)

This invention relates to set screws or retaining screws that are adapted to extend through pulleys and the like to prevent rotation of the pulley upon a shaft or axial movement thereof with respect to a shaft. It is, of course, understood that this is merely one illustration of a place where a set screw or a retaining screw of this invention can be used, there being hundreds of other uses for retaining and set screws.

An object of the invention is to provide a set screw or a retaining screw of an improved type that is constructed and arranged in a manner that a single length base screw can be used for setting into a tapped hole and the screw will have a nose of any length extending therefrom that will pass through the remaining length of the tapped hole or untapped hole to engage a shaft or other mechanism that extends through the member with which the set screw or retaining screw is associated.

One of the chief disadvantages of the set screws on the present day market is the fact that each and every screw must be manufactured to a predetermined dimension in length so that it can sit in a special space, or else the design of the mechanism with which the set screw is to be associated must be designed in a manner that it will accommodate standard set screws. However, wherever a special set screw is needed it must be of a special length and the hole to receive the set screw must be tapped throughout the entire length of the hole in order to permit the set screw to ride upon the device it is to secure in position. Such arrangements therefore require a very high inventory in special sized set screws that are required to fill special needs.

Also, a major number of such screws on the market today are adapted to engage the mechanism that is to be retained in position by frictional contact by means of the actual body of the set screw itself so that when such screws are rotated in a hole into which they are threaded the end of such screw will engage the mechanism to be secured and will dig into the mechanism. Actually, for this purpose the ends of the set screws are hardened so that they will not be deformed when they are forced into engagement with the mechanism to be secured, but rather the mechanism to be secured will be deformed by means of the set screw in order to insure good tight engagement therewith. In many instances, wherein shafts are to be attached to various devices and constant adjustment of the shaft is required in order to locate the device thereof, such type of set screws as are available today, mark the shaft to such an extent that after the set screw has been placed on the shaft a number of times it is impossible to relocate any device on the shaft with any particular degree of accuracy.

Also, all of the set screws that are in use today on the present market require that the tapped hole to receive the same shall be tapped the entire depth of the hole so that the end of the set screw can be located in the bottom of the hole or a long threaded set screw will be threaded into the tapped hole so that the top of the set screw will be flush with the top of the device that it is associated with to permit engagement therewith with a conventional screw driver or "Allen" wrench.

The set screw or retaining screw of this invention has been constructed and arranged in a manner that a standard base screw can be manufactured, and a nose of any length can be attached to the standard base screw.

Regardless of the depth of the hole that is to be traversed by the set screw, it is only necessary that a nose of a predetermined length shall be attached to a standard base screw member.

It is also an object of this invention to provide a set screw or a retaining screw that is constructed and arranged in a manner that the tapped hole with which it is to be associated need only be tapped a relatively short distance of its entire length thereby reducing the cost of producing tapped holes and eliminating many broken taps in the manufacture of tapped holes that are of extreme length.

It is another object of the invention to provide a set screw or a retaining screw that may be manufactured in a more or less standard manufacturing process to standard dimensions that can be subsequently used in any hole of any length merely by attaching a nose member to the standard base screw that is sufficiently long to extend through the hole with which the set screw is to be associated.

It is another object of the invention to provide a set screw or a retaining screw that is constructed and arranged in a manner that the nose of the set screw shall pass through a hole that has been previously drilled to a size sufficient to be tapped to receive the threads of a threaded base member of the set screw.

Still another object of the invention is to provide a set screw having a standard base member that is threaded and is adapted to be associated with a nose member rotatably positioned upon the threaded base member so that the nose member when in engagement with the device to be secured will not rotate or dig into the device and thus prevent marring of the device even though the base of the set screw is rotated to apply pressure upon the nose member and to force the same into engagement with the device to be retained.

In considering the various aspects and the novelty of this invention the applicant is well aware of such set screws or retaining screws as disclosed in the patent to Barnes 1,581,096, patented April 20, 1926. However the set screw of this type does not have the advantages that have heretofore been set forth. In the first place, a set screw of the type disclosed in this patent requires that a hole to receive it shall be threaded throughout the entire length of the hole so that the nose of the set screw can be forced into engagement with the device to be secured. In addition, each time a set screw of a different length is to be manufactured, according to the disclosure of this patentee, it is necessary that he produce a special nose member having a shank of sufficient length that it extends completely through the set screw so that it can be retained in the set screw by peening over the top of the shank member of the nose. When manufacturing set screws according to the disclosure of this patentee there will be no decrease in the inventory required for set screws of special length because each and every one must be manufactured to meet the conditions of a special length tapped hole into which the set screw is to be placed.

On the other hand, this applicant has provided a construction of a set screw or a retaining screw wherein he can set up to manufacture the base screw member as a standard production article in many thousands, with absolutely no change in the base member. After the base member is manufactured he can then attach a nose member of any length to the base member by a standard procedure so that irrespective of the depth of hole with which the set screw is to be associated there is no change required in the general and basic procedure of manufacturing the set screw. Thus it is seen that the applicant's set screw can meet many varying conditions without altering the basic manufacturing procedure, whereby he is able to substantially reduce the cost of manufacture of the set screws and reduce the inventory of those required to retain such screws on their shelves in stock.

The foregoing objects and advantages will become more apparent from the drawing and the following description.

In the drawing:

Figure 1 is a cross-sectional view showing a pulley mounted on a shaft illustrating the use of a short nose set screw for retaining the pulley on the shaft.

Figure 2 is a cross-sectional view illustrating the use of a pulley on a shaft and showing the use of a long nose set screw with the same standard base as the set screw shown in Figure 1 for holding the pulley on the shaft.

Figure 3 is an enlarged cross sectional view taken through the vertical section of the screw shown in Figure 1 taken along line 3—3 of Figure 1.

Figure 4 is a vertical cross-sectional view of the set screw illustrated in Figure 2 and is taken along line 4—4 of Figure 2.

Figure 5 is a transverse cross-sectional view of the set screw shown in Figure 3 and is taken along line 5—5 of Figure 3.

Figure 6 is a vertical cross-sectional view similar to Figure 4 but showing the manner in which a nose member of the set screw is attached to the threaded base member.

Figure 7 is an elevational view of the set screw shown in Figure 4 but showing the use of a screw driver slot in the head of the set screw in place of the hexagon wrench socket illustrated in Figure 4, but illustrating that the base member of the set screw is the same as the base member of the set screw shown in Figure 4.

Figure 8 is an elevational view illustrating the use of a hexagonal head on a screw but showing that the general principles on the manufacture of the screw is the same as disclosed with regard to any of the other figures in the drawing.

Figure 9 is a cross-sectional view of a modified structure of the set screw showing the use of a modified driver slot therein.

The set screw or retaining screw of this invention consists of a basic body member 10 that has external threads 11 extending throughout the length of the body member 10. This basic body member 10 is adapted to be manufactured in a specified and determined length that may remain the same regardless of whether the set screw is to receive a hexagonal socket, a screw driver slot or any other type of means for rotating the set screw base member.

A recess 12 is provided within the base member 10 that is axial of the base member 10. The bottom wall 13 of the recess 12 is spaced closely adjacent the bottom wall 14 of the base member 10. The distance between the wall faces 13 and 14 can be maintained at a predetermined spaced distance for all set screws that are to be made by this process so that there will be a standardization of the procedure in making the set screws as well as the procedure in subsequently assembling them upon nose bodies. By standardizing the procedure in this manner, it is possible to make the base screw member 10 on a standard production set up and there will be no changes needed when set screws of any special length are required.

As illustrated in Figures 3 and 4 a base screw member 10 is provided with a hexagonal socket 15 that is adapted to receive an "Allen" wrench for rotating the same.

A hole 16 extends through the wall between the surfaces 13 and 14 that is axial with the base member 10. Here again in all of the set screws to be manufactured, this hole can be the same diameter throughout so as to standarize procedure.

The set screw illustrated in Figure 4 is provided with a long nose member 18 that is preferably of a diameter equal to the root diameter of the thread 11 or just slightly smaller than the root diameter. Since holes that are usually drilled to receive the thread 11, to be subsequently tapped for the same, are of a size that are slightly larger than the root diameter of the threads 11, it will be apparent that if the nose member 18 is equal to the root diameter of the threads 11 or just slightly smaller than the same it will pass through any hole that will be drilled to receive a tap for threading the hole in a manner to receive the threads 11.

The nose 18 is provided with a cylindrical protrusion 19 that is adapted to extend through the hole 16 provided in the base set screw 10 where the protruding member 19 has a diameter that is slightly smaller than the diameter of the hole 16 so that it is a free fit within the hole 16 whereby the nose 18 can rotate with respect to the body 10. The protruding portion 19 is provided with an inverted cone-shaped depression 20 therein in the top surface of the protrusion 19.

To assemble the base member 10 upon the nose member 18, the protruding portion 19 is extended through the hole 16 in the base member 10 as illustrated in Figure 6. A staking tool 21 is provided that is preferably a tri-edged tool having the edges 22 that are disposed on an angle of an inverted cone that is substantially shallower than the inverted cone-shaped recess provided in the top surface of the protrusion 19. By striking a sharp hammer blow upon the staking tool 21, the extreme upper edges of the protrusion 19, which are relatively thin, will be pressed outwardly at three points by the tool 21, these points being indicated by the numeral 23 in Figure 5. It is not essential nor is it desirable that these protruding lips 23 shall extend any great distance beyond the diameter of the protruding member 19 because it is only necessary that they extend a sufficient distance to prevent the nose member 18 from falling off of the base member 10 in case the set screw is to be removed from a hole after it has once been placed therein. In fact, the set screw can be assembled in a hole by first placing the nose member 18 within the hole that has been previously drilled to receive the same and the set screw base 10 can then be inserted in the threaded portion of the hole to force the nose member down against the member to be retained thereby. Subsequently the staking tool 21 can be engaged upon the protrusion 19 and a suitable hammer blow struck upon the staking tool in order to turn over the edges of the protrusion 19 in a manner as illustrated by the numeral 23 on Figure 5.

If at any time it is desired to remove the base member 10 from a nose member 18 it will be a relatively easy job to do the same because the protruding flange portion 19 will not have been forced outwardly to any great extent by means of the staking tool, so that it will be possible to pull the nose member from the base member by means of a little force. Another nose member can then be inserted on the base member 10, and the set screw base member 10 can be re-used with a new nose member 18 of the same length or of a different length, and can be used in a different hole.

If the hole that is to receive the set screw or retaining screw is relatively deep as illustrated in Figure 4, the hole 25 will be first drilled in conventional manner by means of a drill of a suitable diameter for receiving a tap that is to thread the upper portion of the hole to receive the threads 11 on the base member 10 of the set screw. The upper portion of the hole 25 will thus be threaded by a suitable tap to form a thread 26. The thread 26 need be formed in the hole 25 only to a sufficient depth as to receive the base member 10. The remaining or major portion of the hole 25 may remain untapped whereby the period of time for the tapping operation is considerably reduced and the danger of breaking the tap in making the long hole has been eliminated.

The use of the set screw will become apparent. It is only necessary to insert the same into the hole 25 with the nose 18 extending through the untapped portion of the hole 25 and thread the base member 10 into the thread 26. As previously mentioned, the protrusion 19 on the nose 18 is a loose fit in the hole 16 so that the nose 18 will stay stationary with respect to the rotating base member 10, after the nose 18 has engaged the shaft 30 so that continued rotation of the base 10 will not force rotation of the nose 18 and thus mar the surface of the shaft 30. The base member 10 is thus freely rotatable with respect to the nose member 18.

As previously mentioned in the specification one of the major purposes of the invention is to reduce the inventory of special set screws having special length and to standardize on the procedure of manufacture of the base member of the set screw. By comparing the set screw illustrated in Figure 3 and that illustrated in Figure 4, it will become apparent that the base member 10 of the set screw shown in Figure 3 is identical with the base member 10 of the set screw shown in Figure 4. However, the nose member 31 attached to the base member 10 of the set screw shown in Figure 3 is substantially shorter than the nose member 18 attached to the base screw 10 shown in Figure 4. At this point it will again be noted that the protrusion 19a of the nose member 31 is of the same length as the protrusion 19 on the set screw heretofore described so that the short nose member 31 can be inserted upon the standard base screw 10 and the lip of the protrusion 19 can be staked over in conventional manner as heretofore described in order to hold the short nose member 31 on the standard screw base member 10. From the foregoing it will be apparent that with the standard base member 10 of the set screw illustrated in Figure 3 being the same base member 10 as that of the set screw illustrated in Figure 4 a threaded hole 32 in the pulley 33 will be of the same tapped depth as the hole 26 that has been illustrated in the pulley 34.

Here again standardization has been achieved and only short taps are required to thread the hole to receive the various set screws regardless of the length of the set screws that are to be inserted into the hole.

To further illustrate the standardization procedure that has been developed by this invention, there is shown in Figure 7 a set screw base 10a that is provided with a screw driver slot 35 for rotating the screw 10a. It will be noted that the central hole 12a is the same diameter and depth hole that has been previously referred to with regard to the hole 12 shown in Figure 4. Also, the nose member 36 that is attached to the screw base 10a is secured thereto in identically the same manner as heretofore described with regard to the set screws disclosed and described with regard to Figures 3 and 4. Actually, the only change in the procedure that has occurred in manufacturing the base screw member 10a is that the screw driver slot 35 has replaced the hexagonal socket head 15 illustrated in the set screws shown in Figures 3 and 4. Therefore, in all respects, the set screw body 10a can be used in the same tapped hole that would be made for the screw body 10, and in fact can be used in the identical tapped holes 26 and 32 illustrated in connection with the drawing shown in Figures 4 and 3 respectively. The nose 36 on the screw base 10a can be of any length for dropping into any hole of special length that may be required.

In Figure 9 there is illustrated a set screw base 10c that has a modified driver slot in the head thereof that prevents spreading of the screw head when force is applied on the driver. The set screw base 10c has a semi-circular slot 50 milled or cut in the top surface thereof. The maximum length of the slot 50 is less than the diameter of the screw 10c, thereby leaving a body section 51 adjacent each end of the slot 50 that joins the body sections on each side of the slot. The upper edge of the screw 10c is therefore unbroken, so that the force of a driver inserted in the slot 50 will not spread the head of the screw or damage the edges of the slot 50.

The driver for use with the screw base 10c has a flat shank 52 adapted to fit into the slot 50 and is provided with a semi-circular nose to fit the contour of the slot 50. A pilot 53 can be provided to extend from the nose of the driver to be positioned in the central hole 12c and thereby prevent accidental movement of the driver out of the slot when force is applied to the driver.

In Figure 8 is shown a further modification of the basic construction of the set screw of this invention wherein the screw base 10b is standardized in all respects with the exception of the hexagonal head 37 that has been added to the screw base 10b. However, the central hole 12b is drilled through the base member 10b to the same point adjacent the bottom wall of the screw member 10b in the same manner as heretofore described with regard to the recess or hole 12 shown in Figure 4. Therefore, the nose member 38 that is attached to the base member 10b can be constructed and arranged in identically the same manner with regard to the nose members heretofore described, and can be attached to the base member 10b in identically the same manner as heretofore described with regard to the nose members 18, 31 and 36.

From the foregoing description it is believed it will be apparent that the particular construction of the set screw or retaining screw of this invention has definite advantages over any of those known to the prior art because, they do not disclose the standardization of screw sizes that can be used in any depth tapped hole desired regardless of the length of the hole and regardless of the distance that the member to be secured will be positioned from the portion of the hole that is tapped. It is necessary only to provide a nose member of the desired length to extend from the base member of the set screw into engagement with the member to be secured. These nose members can be of any length desired and can be made from any common cylindrical stock that can be found in any shop.

While the apparatus disclosed and described herein constitutes a preferred form of the invention, yet it is to be understood that mechanical alterations can be made to the device that fall within the purview of the invention, and that such modifications as fall within the scope of the appended claims are intended to be included herein.

Having thus fully described my invention, what I claim as new and desire to secure by Letters Patent, is:

1. A retaining screw comprising, a body member, external threads on said body member, a recess in said body member having the bottom wall thereof closely adjacent the bottom surface of said body member whereby a relatively narrow wall section is provided therebetween, an axial opening through said wall section that is substantially smaller than said recess, a separable nose member disposed adjacent the bottom surface of said body member shaped in such a manner as to have the side wall thereof disposed within a cylinder defined by the root diameter of said threads, a protrusion extending axially from one end of said nose member and extending through said hole in said wall section of said body member and freely rotatable therein to permit freedom of rotation of said nose member relative to said body member, said protrusion having outwardly thrust portions thereon that resist removal of said nose member from said body member.

2. A retaining screw comprising, a body member, external threads on said body member, a recess in said body member having the bottom wall thereof closely adjacent the bottom surface of said body member whereby to provide a relatively narrow wall section therebetween, an axial hole through said wall section having a diameter substantially less than the diameter of said recess, a nose member shaped in such a manner as to have the side wall thereof disposed within a cylinder defined by the root diameter of said threads, an axial protrusion on one end of said nose member extending through said hole and having a diameter smaller than said hole whereby to permit free rotation of said body member relatively to said nose member with said protrusion, said protrusion having the top surface thereof extending a relatively short distance above the bottom surface of said recess and contained within the recess, and outwardly pressed portions on the upper edge of said protrusion whereby to resist removal of said protrusion through said hole.

3. A retaining screw comprising, a body member, external threads on said body member, a recess in said body member having the bottom wall thereof closely adjacent the bottom surface of said body member whereby to provide a relatively narrow wall section therebetween, an axial hole through said wall section having a diameter substantially less than the diameter of said recess, a nose member having a transverse cross sectional dimension not greater than the root diameter of said threads, an axial protrusion on one end of said nose member extending through said hole and having a diameter smaller than said hole whereby to permit free rotation of said body member relatively to said nose member with said protrusion, said protrusion having the top surface thereof extending a relatively short distance above the bottom surface of said recess and contained within the recess, and outwardly pressed portions on the upper edge of said protrusion whereby to resist removal of said protrusion through said hole, said outwardly formed edges on said protrusion being spaced from the bottom wall of said recess whereby to permit free axial movement of said body member relatively to said nose member.

4. A retaining screw comprising, a body member, external threads on said body member, a recess in said body member having the bottom wall thereof closely adjacent the bottom surface of said body member whereby to provide a relatively narrow wall section therebetween, an axial hole through said wall section having a diameter substantially less than the diameter of said recess, a nose member shaped in such a manner as to have the side wall thereof disposed within a cylinder defined by the root diameter of said threads, an axial protrusion on one end of said nose member extending through said hole and having a diameter smaller than said hole whereby to permit free rotation of said body member relatively to said nose member, said protrusion having the top surface thereof extending a relatively short distance above the bottom surface of said recess and having a recess in the top surface thereof whereby to provide relatively thin edge portions on the extending edge of said protrusion, a plurality of outwardly formed portions on said thin edge portion of said protrusion whereby to resist removal of said nose from said body but which does not prevent removal of said nose from said body when a force greater than the force required to retain the nose and said body together is applied upon said nose to remove the same from said body.

5. A retaining screw comprising, a basic body member having a standardized length, external threads on said body member, a recess in said basic body member axial therewith having the bottom wall thereof closely adjacent the bottom surface of said body member whereby to produce a narrow and standardized thickness of wall section therebetween, an axial hole of standardized diameter through said wall section, and a nose member having a transverse cross sectional dimension not greater than the root diameter of the threads of said body member having an axial protrusion extending from one end thereof, said protrusion having a diameter less than the diameter of said hole and a standardized length not substantially greater than the thickness of said wall section, said nose member being adapted to be of any length desired whereby to produce a retaining screw that can be inserted into a hole partially threaded to receive said body member with the nose member extending through the unthreaded portion of the hole.

CLAYTON E. WYRICK.